United States Patent Office 3,394,106
Patented July 23, 1968

3,394,106
POLYMERS OF 1,4-BENZOQUINONES
Burton C. Anderson and William H. Sharkey, Wilmington, Del., assignors to E. I. du Pont de Nemours and Company, Wilmington, Del., a corporation of Delaware
No Drawing. Filed July 29, 1965, Ser. No. 475,858
8 Claims. (Cl. 260—63)

ABSTRACT OF THE DISCLOSURE

High molecular weight poly(1,4-benzoquinones) which are prepared from 1,4-benzoquinones at a temperature below the flash temperature of said benzoquinones and a pressure of at least 20 kilobars are useful as stylus points for polishing copper and in the form of molded objects.

---

This invention relates to a new class of thermally stable organic polymers which exhibit a surprisingly high hardness, and to a process by which such polymers may be prepared.

The polymers of this invention are prepared from 1,4-benzoquinones having the formula

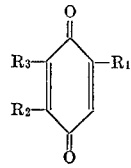

wherein $R_1$, $R_2$ and $R_3$ each is selected from the group consisting of hydrogen and lower alkyl (of 1–6 carbon atoms), and wherein $R_2$ and $R_3$ taken conjointly with the 1,4-quinone moiety is

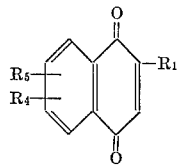

wherein $R_4$ and $R_5$ each is selected from the group consisting of hydrogen and lower alkyl (of 1–6 carbon atoms). In the preferred polyquinones of this invention $R_1$, $R_2$ and $R_3$ are hydrogen. The polymers of this invention are characterized as: (a) having the same elemental composition as the quinone from which they are derived; (b) having a Knoop hardness of at least 50 under a 100 gram load; (c) being insoluble in refluxing toluene; and (d) losing no more than 50% of their weight when heated to 600° C. at a rate of 6° C. per minute.

The polymers of this invention are prepared by a process which comprises heating a quinone as defined above under a pressure of at least 20 kilobars at a temperature below the temperature at which an exothermic decomposition occurs under the pressure employed (flash temperature). The process variables must be determined for each quinone with reference to its purity and the operating conditions which may be achieved in the pressure apparatus employed. Generally, the maximum reaction temperature is determined by introducing the monomeric quinone into the pressure cavity of the pressure apparatus with a sensitive thermocouple in or near the sample, and heating the sample rapidly under pressure. The flash temperature, which is the temperature at which a strongly exothermic reaction commences, can be read from a plot of temperature versus time as a discontinuity in the curve. With the flash temperature having been determined, the polymerization is conducted on a fresh sample of quinone at a temperature which is between the flash temperature and usually not more than 75° C. below the flash temperature. Preferably the reaction is conducted at a temperature which is 10–30° C. below the flash temperature. Normally the reaction temperature will vary between about 50 and 350° C. After the quinone has partially polymerized, thus changing the flash temperature, the temperature may be increased to complete polymerization. This temperature generally is 50–200° C. above the initial polymerization temperature but should be less than the decomposition temperature of the polymer.

Although the reaction pressure should be at least 20 kilobars, generally the pressure is within the range of 20–100 kilobars, with 50–70 kilobars being preferred. Pressure and temperature are maintained during polymerization for at least 0.25 hour. Depending upon the temperature and pressure employed, the polymerization is continued for up to 20 hours or longer. When polymerization is conducted in two stages, i.e., initially at one temperature and then subsequently at a higher temperature, a period of 1–4 hours at each temperature usually is sufficient.

To obtain the high pressures necessary in the reaction, a tetrahedral anvil pressure device can be employed, such as described by E. C. Lloyd et al., Journal of Research National Bureau of Standards, 63C, 59 (1959). In this device the reactants are placed in a boron nitride container which fits in a graphite sleeve that serves as a resistance heater. This assembly is enclosed in a pyrophyllite tetrahedron and placed in the anvil device.

To establish the amount of pressure achieved in the device, it is necessary to correlate a measurable variable, namely, electrical resistivity, as a function of pressure. The device employed herein was pressure calibrated using bismuth, thallium and barium as calibrating materials at room temperature. In all cases silver chloride was the surrounding medium and the combination was inserted in a 1.25 in. tetrahedron.

The calibration points used appear in the 1963 edition of The American Institute of Physics Handbook, page 443, as follows (all values for ambient temperature):

Bismuth I→II 25.37±0.02 kb.
Bismuth II→III 26.96±0.18 kb.
Thallium II→III 36.9±0.11 kb.
Barium II→III 59.0±1.0 kb.

Compression in the following examples was made on the cold assembly and the charge was then heated to the desired temperature as measured by an appropriate thermocouple. The pressure unit is a bar, equivalent to $10^6$ dynes/cm.² A kilobar is equivalent to $10^9$ dynes/cm.² No pressure correction for thermocouple behavior has been made, standard E.M.F. tables for 1 atmosphere being employed.

In addition to the tetrahedral anvil device for achieving the pressures required herein, a Bridgman monobloc apparatus likewise can be utilized. This apparatus is described in articles by P. W. Bridgman in Physical Reviews, 48, 893 (1935), and American Scientist, 31, 16 (1943).

Additional details appear in the following examples which illustrate specific embodiments of the invention.

It is to be understood that these embodiments do not comprise the entire invention but they are intended rather to be illustrative of a broader inventive concept for which protection by the patent laws is being sought. The invention, in its broader context, finds supporting disclosure throughout the entire specification and not in the examples alone.

Example I.—Polymerization of 1,4-benzoquinone at 65 kb.

(A) *Determination of flash temperature.*—Reagent grade 1,4-benzoquinone was recrystallized from petroleum ether and sublimed. The crystalline material, about 100 mg., M.P. 115.7° C., was compacted in a short platinum sleeve 0.167 in. in diameter, and the ends were capped with platinum covers which were held in place by friction. The sample was charged into the reaction space of a tetrahedral anvil apparatus, with a thermocouple connected to the platinum sleeve. Pressure was applied and the temperature was raised. When the reading on the thermocouple reached 94° C. at 65 kb., an exothermic reaction occurred; the maximum reading was 478° C. After cooling, the sample was recovered; it was black and had no infrared absorption, suggesting that it was a carbonaceous material.

(B) *Polymerization.*—A sample of quinone, purified as described above, was placed in the tetrahedral anvil apparatus and pressured to 65 kb. It was heated to 75° C. and maintained at that temperature for 5 hours. After cooling, the sample was recovered and the hard, cohesive plug of material was crushed and heated in vacuum to remove any low-boiling products.

The product, which was obtained in approximately quantitative yield, did not melt on heating to 400° C. and was unaffected by boiling toluene. Its elemental analysis was essentially the same as that of the starting material, indicating that an addition type of polymerization had taken place.

*Analysis.*—Calcd. for $(C_6H_4O_2)_n$: C, 66.66; H, 3.73. Found: C, 65.09, 65.07; H, 4.06, 4.15.

The infrared spectrum, determined on a KBr pellet, showed bands in hydroxyl, carbonyl, aromatic, and carbon-oxygen stretching regions, and all bands were broad. A shoulder on the broad hydroxyl band suggests saturated CH absorption.

Example II.—Polymerization of 1,4-benzoquinone at 25 kb.

The procedure of Part A of Example I was repeated to determine the flash temperature at 25 kb. in the tetrahedral anvil apparatus. Under these conditions, a strongly exothermic reaction occurred, which resulted in rupture of the gasket, at 225° C. A second run was made at 200° C. at 25 kb. pressure for 5 hours. The product of this run was about identical to that of Example I, according to infrared analysis. It was not, however, as cohesive, as determined by gross examination.

Example III.—Polymerization of 1,4-benzoquinone in two stages

A sample of 1,4-benzoquinone, purified as described in Part A of Example I, was inserted in the tetrahedral anvil apparatus and pressured to 65 kb. The temperature was raised to 70° C. and maintained at that temperature for two hours. The temperature was then raised during six minutes to 200° C. and maintained at that temperature for two hours. The product obtained from this run was a cohesive, brown molding, conforming to the shape of the pressure cavity, and was extremely hard for an organic material.

Tukon hardness measurements using diamond indentation techniques on this material and on material prepared as described in Example I gave Knoop hardness numbers ranging from 70 to 200. The material of Example III gave $KHN_{100}$ of 176±25. The material readily scratched metallic copper, a test which confirmed the hardness measurement. A description of the Tukon test for determination of Knoop hardness numbers may be found in "Micro-Indentation Hardness Testing," B. W. Mott, Butterworth Scientific Publications, London, 1956, especially at pages 18 and 254.

Example IV.—Polymerization of 1,4-benzoquinone in the Bridgman monobloc

A polytetrafluoroethylene container with a cylindrical sample chamber ⅜ in. in diameter x ⅜ in. in length was charged with compacted, purified 1,4-benzoquinone and placed in a Bridgman monobloc apparatus. The sample was pressured to 25 kb. and heated at 200° C. for 16 hours. The product obtained from this reaction was very similar, as shown by infrared analysis, to that of Example I, but it was not as cohesive.

Example V.—Polymerization of 2,5-dimethyl-1,4-benzoquinone

A sample of 2,5-dimethyl-1,4-benzoquinone was purified by recrystallization from alcohol and by sublimation. The flash temperature of this material was determined by the procedure described in Part A of Example I to be 352° C. at 65 kb.

Purified 2,5-dimethyl-1,4-benzoquinone, M.P. 124–5° C., was heated in the tetrahedral anvil apparatus at 330° C. at 65 kb. pressure for four hours. The product which was recovered was shown by infrared analysis to be different from the starting material. As with the products from the previous examples, its polymeric nature was shown by the broadness of the infrared bands and its insolubility, for example, in boiling toluene.

Example VI.—Polymerization of 1,4-naphthoquinone

A sample of 1,4-naphthoquinone was purified by recrystallization from alcohol followed by careful drying in vacuum. The flash temperature for this material, determined as described in Part A of Example I, was 282° C. at 65 kb. A sample, M.P. 125–6° C., heated at 65 kb. at 260° C. for 4 hours was converted to polymer having the form of a solid molding which conformed to the shape of the pressure cavity. Infrared analysis confirmed the polymeric structure; the bands were broad and diffuse and similar to those for the compounds described in Examples I to V. The polymer was not soluble in boiling toluene.

Using the general process of the preceding examples, and especially Example I, the following quinones can be converted to polymers:

2,6-diethyl-1,4-naphthoquinone
2,6-di(n-propyl)-1,4-benzoquinone
2,3-di(isopropyl)-1,4-benzoquinone
2,5-di(2'-methylpentyl)-1,4-benzoquinone
2-methyl-5-ethyl-1,4-benzoquinone
6,7-dimethyl-1,4-naphthoquinone
5,7-dimethyl-1,4-naphthoquinone The polymeric quinones of this invention are especially useful because of the high hardness and excellent thermal stability which they exhibit. Exempli gratia, a piece of the polyquinone prepared in Example III was mounted in a polymethylmethacrylate rod so that the polyquinone protruded from one end. The stylus was used to polish tarnished copper articles. A bright copper surface was produced. When a sample of the polyquinone from Example III was heated to 750° C. in air at a rate of 6° C./min., and thereafter cooled to room temperature, about 50 weight percent of the polyquinone still remained.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A high molecular weight thermally stable poly-1,4-benzoquinone having a Knoop hardness of at least 50 and prepared from a 1,4-benzoquinone having the formula

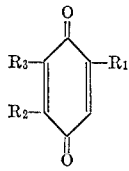

wherein $R_1$, $R_2$ and $R_3$ each is selected from the group consisting of hydrogen and lower alkyl, and wherein $R_2$ and $R_3$ taken conjointly with the 1,4-quinone moiety is

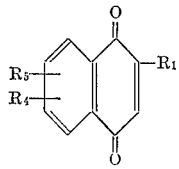

wherein $R_4$ and $R_5$ each is selected from the group consisting of hydrogen and lower alkyl at a temperature below the flash temperature of said 1,4-benzoquinone and a pressure of at least 20 kilobars.

2. The poly-1,4-benzoquinone of claim 1 prepared from 1,4-benzoquinone.

3. The poly-1,4-benzoquinone of claim 1 prepared from 2,5-dimethylbenzoquinone.

4. The poly-1,4-benzoquinone of claim 1 prepared from 1,4-naphthoquinone.

5. The process for preparing the poly-1,4-benzoquinones of claim 1 which comprises the steps of heating, for at least 0.25 hr., a 1,4-benzoquinone having the formula

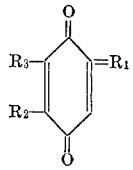

wherein $R_1$, $R_2$ and $R_3$ are as defined in claim 1, at a pressure of at least 20 kilobars and a temperature below the flash temperature of said 1,4-benzoquinone at the reaction pressure, and thereafter recovering said poly-1,4-benzoquinone.

6. The process of claim 5 wherein said 1,4-benzoquinone is heated for 0.25 to 20 hours, at a pressure of 20–100 kilobars and within a temperature range from about 75° C. below the flash temperature to the flash temperature of said 1,4-benzoquinone.

7. The process of claim 6 wherein the pressure is 50–70 kilobars and the temperature is 10–30° C. below the flash temperature of said 1,4-benzoquinone.

8. The process of claim 6 wherein said 1,4-benzoquinone is 1,4-benzoquinone.

No references cited.

WILLIAM H. SHORT, *Primary Examiner.*

L. LEE, *Assistant Examiner.*